(12) United States Patent
Daun-Lindberg et al.

(10) Patent No.: US 7,282,899 B1
(45) Date of Patent: Oct. 16, 2007

(54) ACTIVE IMPENDANCE CURRENT-SHARE METHOD

(75) Inventors: Timothy C. Daun-Lindberg, Rochester, MN (US); Brian J. Hruby, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/423,331

(22) Filed: Jun. 9, 2006

(51) Int. Cl.
*G05F 1/00* (2006.01)
(52) U.S. Cl. .................................... 323/272
(58) Field of Classification Search ............... 323/268, 323/271, 272, 280, 282, 285
See application file for complete search history.

(56) References Cited

U.S. PATENT DOCUMENTS

| | | | | |
|---|---|---|---|---|
| 6,150,803 A * | 11/2000 | Varga | .......................... | 323/282 |
| 6,201,723 B1 * | 3/2001 | Farrington | .................. | 363/147 |
| 6,894,466 B2 * | 5/2005 | Huang et al. | ............... | 323/272 |
| 2003/0214274 A1 * | 11/2003 | Lethellier | .................... | 323/272 |
| 2006/0171178 A1 * | 8/2006 | Shvarts | ........................ | 363/65 |
| 2006/0273740 A1 * | 12/2006 | Saeueng et al. | ............ | 315/291 |

\* cited by examiner

*Primary Examiner*—Adolf Berhane
(74) *Attorney, Agent, or Firm*—Cantor Colburn LLP; Robert R. Williams

(57) ABSTRACT

Exemplary embodiments include An active impedance current-sharing circuit including: a power supply in electrical communication with a current sense resistor; a differential amplifier in electrical communication with the current sense resistor; a gate adjust amplifier in electrical communication with the differential amplifier; an ORing MOSFET in electrical communication with the gate adjust amplifier and the current sense resistor; a current share resistor in electrical communication with a current share bus and the gate adjust amplifier; and a current share output in electrical communication with the ORing MOSFET, wherein the circuit allows two or more power supplies that are not designed for current share to be connected in parallel and current share by actively modulating the ORing MOSFET between its linear and fully enhanced regions.

5 Claims, 2 Drawing Sheets

ACTIVE IMPENDANCE CURRENT-SHARE METHOD

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Technical Field

The present disclosure relates generally to electrical and electronic circuits and more specifically to a method of active impedance current sharing.

2. Description of the Related Art

Modern digital electronic circuits rely upon the delivery of significant currents to achieve required power for operation, as the trend has been toward lower voltages. This presents a dilemma in circuit design. Delivering high current loads, e.g., hundreds of amps, to printed circuit boards and integrated circuit devices can raise the cost of circuits. High current buses add significant expense to circuits and devices, but are generally necessary to deliver high current to printed circuit boards.

The information technology equipment being designed today are systems requiring extremely high availability. Powering these systems in an extremely cost-conscious market requires special powering schemes. For redundancy, 1+1 or N+1 configurations are required. A single voltage, or a small number of voltages distributed from the bulk power supply into the chassis simplify the AC/DC converters and allow for bulk power commonality across system platforms, saving development costs. There is an increasing focus on quality and reliability forced by market pressures. Density pressure will continue driving a lower number of output voltages from the bulk supplies. Cost pressures drive more use of Voltage Regulators Down (VRDs) and Voltage Regulator Module (VRM) Common Building Blocks (CBBs).

The need for this equipment to be operational basically 100% of the time mandates that redundant, concurrently maintainable equipment be used. Regardless of form factor and specific electrical requirements, critical electrical features for a power supply in embedded systems are current sharing and the ability to hot-swap. These are the key operational parameters that allow the high-reliability fault tolerance required for today's high uptime systems.

High-availability systems use at least one extra power supply so that failure of one supply does not power down the system. For such an operation, the supplies have to share the load currents. Redundant power conversion designs using multiple converters also require multiple pins for current sharing on +5-, +3.3-, and +12-V outputs. To increase the reliability of the systems and eliminate the possibility of a single point of system failure due to current-sharing connection, some manufacturers employ automatic current sharing that does not require any bus. Passive current sharing is a method of paralleling the outputs of two or more power supplies or DC/DC converters so that they share the load. This is simple, inexpensive and easy to implement. Although passive current sharing provides a highly scalable means of accommodating demands for higher power, one of the converters will always try and output more than half the total current. To implement current sharing between two converters using o-ling diodes, their output voltages ideally need to be adjusted to be perfectly matched under all conditions. However, in the real world, it is nearly always impossible to achieve this degree of trim accuracy.

Droop sharing is also a very simple method to implement. Droop sharing does not require a current share "bus" and works by decreasing output voltage while increasing output current. When the output current of one power supply increases, its output voltage slightly decreases to force the other supplies to take more current. If all supplies are adjusted to the same voltage at a given load and have the same voltage versus current slope, they will share the load with high accuracy. When the load to the power supply rapidly increases, the voltage dip occurs, but with droop it starts at an initially higher voltage level. However, in order for accurate current sharing, the droop method requires a precise voltage setpoint and droop slope. Equal impedance between supplies would be needed as well; realistically this does not happen.

Most embedded systems allot separate pins on power connectors for current sharing. For example, the Compact-PCI standard allots three pins for current sharing on +5-, +3.3-, and +12-V outputs. The respective pins are then paralleled on the backplane, which lets the power supplies share information about their currents. What is needed is a highly reliable, accurate method of current sharing. Besides the advantages such as fault tolerance, another benefit to tightly sharing outputs would be for redundant over-current protection (OCP) when two converters are operating in parallel.

SUMMARY

Exemplary embodiments include an active impedance current-sharing circuit including: a power supply in electrical communication with a current sense resistor; a differential amplifier in electrical communication with the current sense resistor; a gate adjust amplifier in electrical communication with the differential amplifier; an ORing MOSFET in electrical communication with the gate adjust amplifier and the current sense resistor; a current share resistor in electrical communication with a current share bus and the gate adjust amplifier; and a current share output in electrical communication with the ORing MOSFET, wherein the circuit allows two or more power supplies that are not designed for current share to be connected in parallel and current share by actively modulating the ORing MOSFET between its linear and fully enhanced regions.

These, and other aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

TECHNICAL EFFECTS

As a result of the summarized invention, technically we have achieved a solution in which provides a highly reliable, accurate method of current sharing.

BRIEF DESCRIPTION OF DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
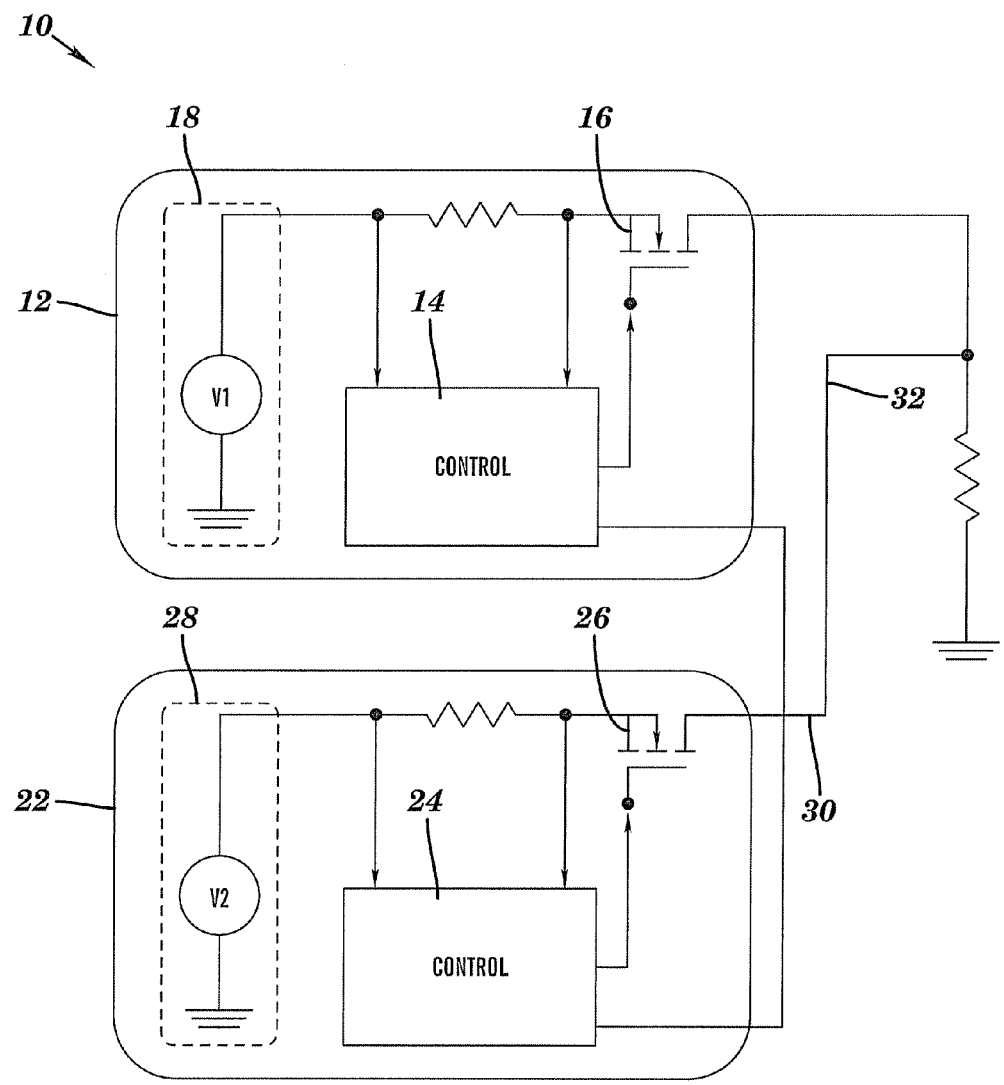
FIG. 1 illustrates a diagram of an active impedance current-sharing circuit in accordance with exemplary embodiments.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

In exemplary embodiments, the requirement of +240VA protection states that in a piece of information technology equipment, it is not permissible to have +240VA of energy available at a customer accessible point. For converters operating in parallel on a 240VA protected domain, two OCP trip points must be in effect; one for when a converter output is singularly powering the domain, and a redundant trip point for when converters are operating in parallel. The redundant OCP trip point is necessary because without it, twice the output of one converter would be available on the domain, which would be unacceptable if the domain needs 240VA protection. If these trip points are not calculated correctly, this can lead to a domain exceeding the 240VA level. It can also lead to false trips, where a paralleled output trips a redundant OCP level even though the total current on the domain is below the total OCP threshold.

Since concurrently maintainable converters have an isolation device, one approach to alter the voltage drop of the isolation device is to enable paralleled converters to better share output currents. However, it is not cost effective to trim the converter's output voltage tightly enough in the manufacturing process to ensure closely matched regulation points, and thus closely match current sharing outputs. Since these isolation devices are commonly an ORing MOSFET, if the gate of the MOSFET could be modulated into its linear region to drop voltage on the output that is regulating higher, more closely matching the two output voltages, this would lead to better current sharing.

Referring now to FIG. 1, a diagram of an active impedance current-sharing circuit is depicted generally as 10. The circuit 10 includes a first power supply 12, a second power supply 22, a current share output 30, and a current share bus 32. The first power supply 12 includes a first controller 14, a first ORing MOSFET 16, and a first power converter output 18. The second power supply 22 includes a second controller 24, a second ORing MOSFET 26, and a second power converter output 28. The first power supply 12 and the second power supply 22 are both connected to the current share output 30 and to the current share bus 32. The circuit 10 provides a robust level of fault tolerance required by high-reliability systems. The circuit 10 receives power from the first power converter output 18 and the second power converter output 28 and quickly turns off the ORing MOSFET that corresponds to one of the power converter outputs when one of the power supplies fails. As a result, the circuit 10 effectively isolates the current share bus 32 and the current share output 30 from the faulty power supply.

Figure 2:
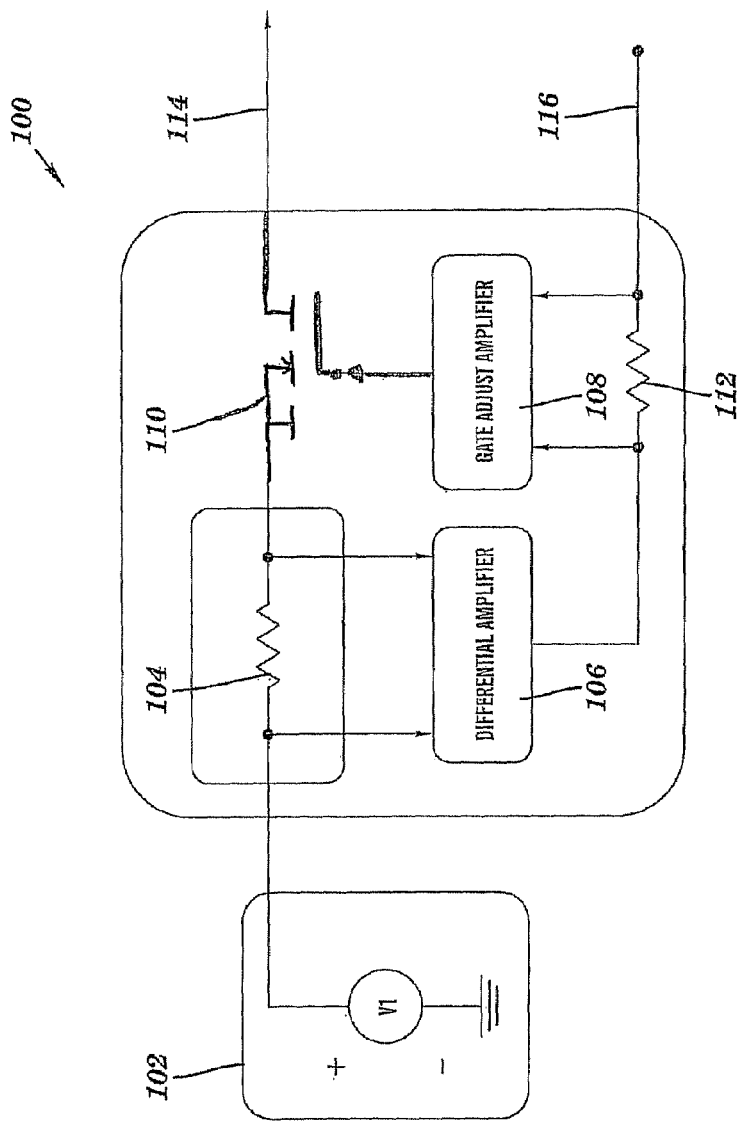
FIG. 2 illustrates a diagram of an active impedance current-sharing circuit in accordance with other exemplary embodiments.

Referring now to FIG. 2, a diagram of an active impedance current-sharing circuit is depicted generally as 100. The circuit 100 includes a power supply 102, a current sense resistor 104, a differential amplifier 106, a gate adjust amplifier 108, an ORing MOSFET 110, a current share resistor 112, a current share output 114, and a current share bus 116. The power supply 102 is in electrical communication with the current sense resistor 104, which is connected to the differential amplifier 106 and the ORing MOSFET 110. The output of the differential amplifier 106 is connected to the gate adjust amplifier 108 and the current share resistor 112. The gate adjust amplifier 108 is also connected to the ORing MOSFET 110. The current share bus 116 is connected to the current share resistor 112 and the current share output 114 is connected to the ORing MOSFET 110.

The differential amplifier 106 is used to sense the current across the current sense resistor 104. The larger the difference in the voltage across the current sense resistor 104, the larger the output of the differential amplifier 106. The gate adjust amplifier 108 is used to adjust the gate of the ORing MOSFET 110 between the linear region and saturation. In exemplary embodiments, pole-zero compensation can be used to improve the bandwidth of the response for stability and speed in recovering from transient conditions. The voltage across the current share resistor 112 indicates whether the converter output is sourcing less than or greater than 50% of the load current. The current share resistor 112 connects the outputs of each current share circuit's differential amplifiers to the current share bus 116. The current share bus 116 voltage is equal to half of the load current. The gate adjust amplifier 108 compares the load current of the converter to the current share bus 116. The circuit 100 reaches steady state when the current across both sense resistors is the same, which is when both converters are sharing equally. Additionally, the circuit 100 may reach steady state by modulating the gate of the ORing MOSFET 110 so it is operating in the linear region.

In other exemplary embodiment, a current share comparator is included in the active impedance current-sharing circuit. The current share comparator changes the circuit so that the ORing MOSFET of the output sourcing the lower voltage would not be adjusted by inserting a switch into the adjust loop. When the output is found to be providing less than half of the load current, the adjust loop switch is opened. The negative input to the current share comparator is the current share bus voltage, and the positive input is the output of the differential sense amplifier. When the output of the differential sense amplifier is higher than the current share bus voltage, the output of the current share comparator is high, closing the loop switch and allowing the gate adjust amplifier to change the ORing MOSFET's gate voltage. When the current share bus voltage is higher than the output of the differential sense amplifier, the output of the current share comparator is low, opening the loop switch. This means the ORing MOSFET of the output will be fully enhanced.

Since one of the ORing MOSFETs will be operated in its linear region, an increase in power dissipation will result. However, these increases are easily contained within the ORing MOSFETs power dissipation limits.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An active impedance current-sharing circuit comprising:
    a power supply in electrical communication with a current sense resistor;
    a differential amplifier in electrical communication with the current sense resistor;
    a gate adjust amplifier in electrical communication with the differential amplifier;
    an ORing MOSFET operating in its linear region in electrical communication with the gate adjust amplifier and the current sense resistor;
    a current share resistor in electrical communication with a current share bus and the gate adjust amplifier; and
    a current share output in electrical communication with the ORing MOSFET,
    wherein the circuit allows two or more power supplies that are not designed for current share to be connected in parallel and current share by actively modulating the ORing MOSFET between its linear and fully enhanced regions;
    wherein pole-zero compensation is utilized to modify a bandwidth of a response for stability and speed in aiding the circuit in recovering from transient conditions;
    wherein voltage across the current share resistor indicates whether the current share output is sourcing less than or greater than 50% of a load current; and
    wherein the current share bus is equal to half of the load current.

2. The circuit of claim 1, wherein the differential amplifier is used to sense the current across the current sense resistor.

3. The circuit of claim 2, wherein the gate adjust amplifier is used to adjust a gate of the ORing MOSFET between a linear region and a saturation region and the ORing MOSFET behaves as an analog device.

4. The circuit of claim 3, wherein the gate adjust amplifier compares a load current of the power supply to the current share bus.

5. The circuit of claim 4, further comprising a current share comparator in electrical communication with the ORing MOSFET.

* * * * *